United States Patent [19]
Ingram

[11] Patent Number: 5,456,587
[45] Date of Patent: Oct. 10, 1995

[54] PLASTIC PELLET DELIVERY SYSTEM

[75] Inventor: Keith W. Ingram, Holland, Ohio

[73] Assignee: Owens-Illinois Closure Inc., Toledo, Ohio

[21] Appl. No.: 332,214

[22] Filed: Oct. 31, 1994

Related U.S. Application Data

[63] Continuation of Ser. No. 95,463, Jul. 22, 1993, Pat. No. 5,386,971.

[51] Int. Cl.⁶ .................................................. B29C 47/08
[52] U.S. Cl. .............................. 425/168; 83/542; 83/582; 264/148; 425/311
[58] Field of Search ..................... 264/142, 148; 425/168, 311, 461, DIG. 230; 83/542, 582

[56] References Cited

U.S. PATENT DOCUMENTS

| | | | |
|---|---|---|---|
| 2,640,033 | 5/1953 | Marshall | 264/148 |
| 3,458,897 | 8/1969 | Roger | 83/582 |
| 3,676,029 | 7/1972 | Hopkin | 425/311 |
| 3,828,637 | 8/1974 | Slack | 83/582 |
| 3,867,081 | 2/1975 | Everett | 425/311 |
| 3,955,605 | 5/1976 | Zupan | 425/261 |
| 4,080,136 | 3/1978 | Peller | 425/311 |
| 4,157,048 | 6/1979 | Lemmer | 83/582 |
| 4,269,584 | 5/1981 | Kroll | 425/311 |
| 4,277,431 | 7/1981 | Peller | 264/148 |
| 4,332,538 | 6/1982 | Campbell | 425/311 |
| 4,440,704 | 5/1984 | Bussey | 425/311 |
| 4,800,792 | 1/1989 | Bertolotti | 83/582 |
| 4,978,288 | 12/1990 | Ellwood | 425/311 |

FOREIGN PATENT DOCUMENTS

| 1488018 | 7/1967 | France | 425/311 |
|---|---|---|---|

*Primary Examiner*—Jay H. Woo
*Assistant Examiner*—Robert B. Davis

[57] ABSTRACT

A plastic pellet delivery system including an extruder nozzle having an orifice and an arcuate surface adjacent the orifice and rigid cutting knife which is eccentrically mounted on a shaft that is positioned and is rotated adjacent the orifice to move the rigid knife eccentrically into and out of engagement with the nozzle surface. The cutting knife is mounted for limited yielding pivotal movement relative to the eccentric mount such that it will deflect angularly with respect to the eccentric mount as it is engaging the nozzle surface such that the free edge of the knife blade tip is moved radially inwardly as the eccentric mount is rotated providing a substantially constant force of the blade against the nozzle surface.

9 Claims, 4 Drawing Sheets

PLASTIC PELLET DELIVERY SYSTEM

This is a continuation of application Ser. No. 08/095,463, filed on Jul. 22, 1993, and now U.S. Pat. No. 5,386,971.

This invention is related to plastic pellet delivery systems and particularly to such systems for delivering a predetermined precise quantity of plastic for use in compression molding plastic closures and compression molding liners in plastic closures.

BACKGROUND AND SUMMARY OF THE INVENTION

In the manufacture of plastic closures by compression molding and the provision of liners in plastic closures, it is common to utilize pellet delivery systems. Typical patents showing such systems are: U.S. Pat. Nos. 2,640,033, 3,458,897, 3,676,029, 3,828,637, 3,955,605, 4,080,136, 4,157,048, 4,269,584, 4,277,431, 4,440,704, 4,800,792 and 4,978,288.

In one type of system which has been used as shown in U.S. Pat. Nos. 4,080,136 and 4,277,431, a flexible and resilient blade is moved along a surface surrounding the extrusion nozzle and after it moves past the surface snaps to accelerate the pellet to the place of use. It has been found that such a system is difficult to set up and requires substantial attention. Furthermore, it requires frequent adjustment. In addition, it has limited life and must be replaced rather frequently.

Accordingly among the objectives of the present invention are to provide a pellet delivery system that is less dependent upon operating skill, needs less attention, utilizes a construction that has longer life; provides better alignment of a cutting knife blade with respect to the extrusion orifice, and provides for better control and placement of the pellet.

In accordance with the invention a plastic pellet delivery system including an extruder nozzle having an orifice and an arcuate surface adjacent the orifice and rigid cutting knife which is eccentrically mounted on a shaft that is positioned and is rotated adjacent the orifice to move the rigid knife eccentrically into and out of engagement with the nozzle surface. The cutting knife is mounted for limited yielding pivotal movement relative to the eccentric such that it will deflect angularly with respect to the eccentric mount as it is engaging the nozzle surface such that the free edge of the knife blade tip is moved radially inwardly as the eccentric mount is rotated providing a substantially constant force of the blade against the nozzle surface.

DESCRIPTION

Figure 1:
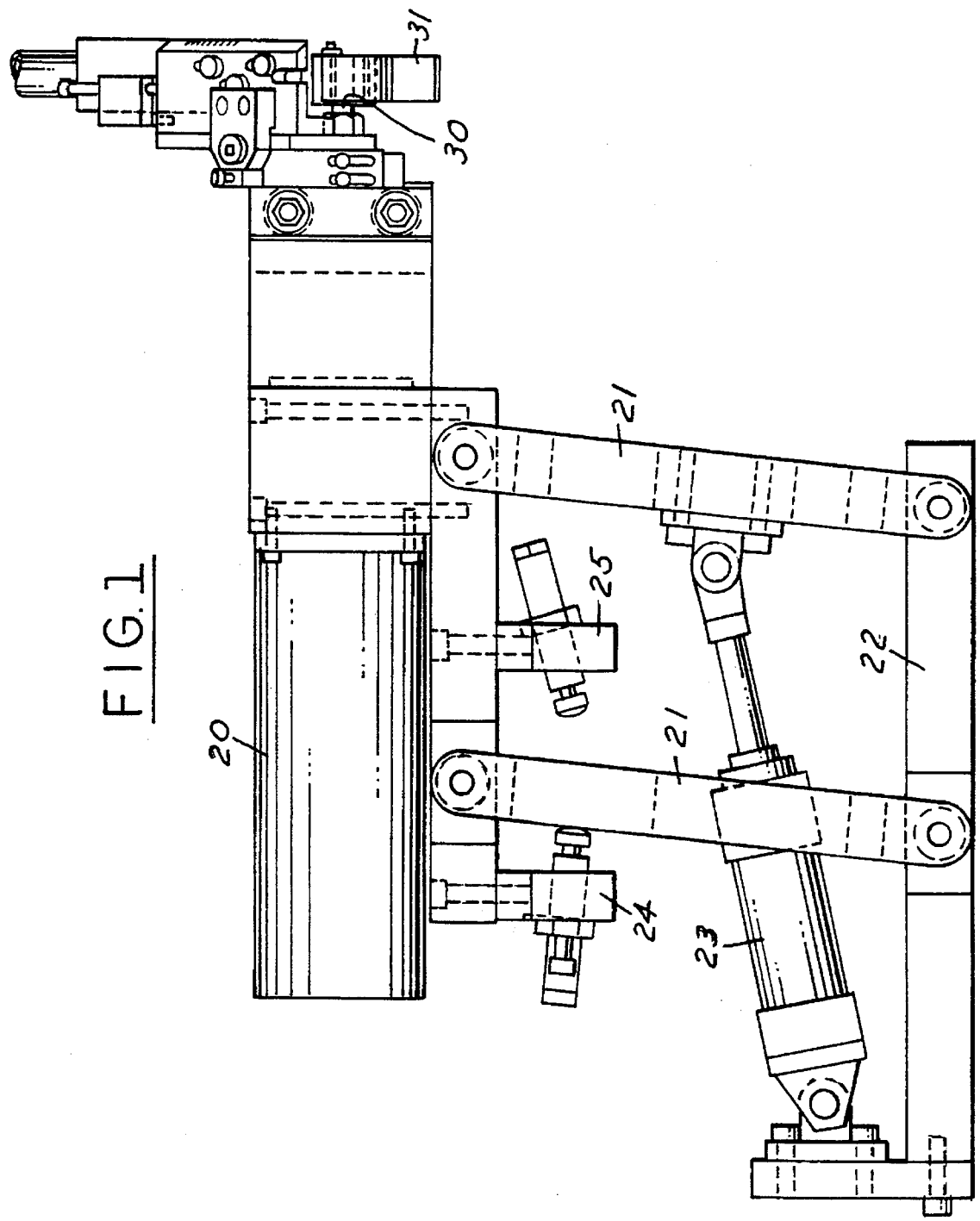
FIG. 1 is an elevational view of a pellet delivery system embodying the invention.

Referring to FIG. 1, the pellet delivery system comprises a cutter assembly 20 that is mounted by the parallel links 21 of a parallelogram linkage which are pivoted to the cutter 20 and a base 22. A fluid cylinder 23 extends between the base 22 and one of the links 21 to move the cutter assembly to and from position. Stops 24, 25 are provided for controlling the movement in each direction. Each stop 24, 25 includes a shock absorber.

Figure 2:
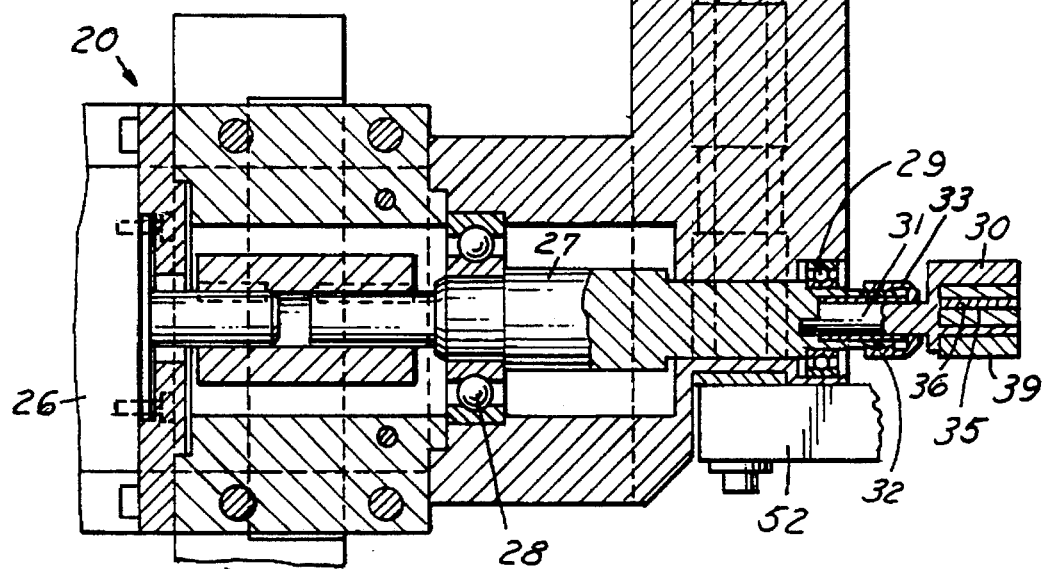
FIG. 2 is a part sectional plan view thereof.
Figure 3:
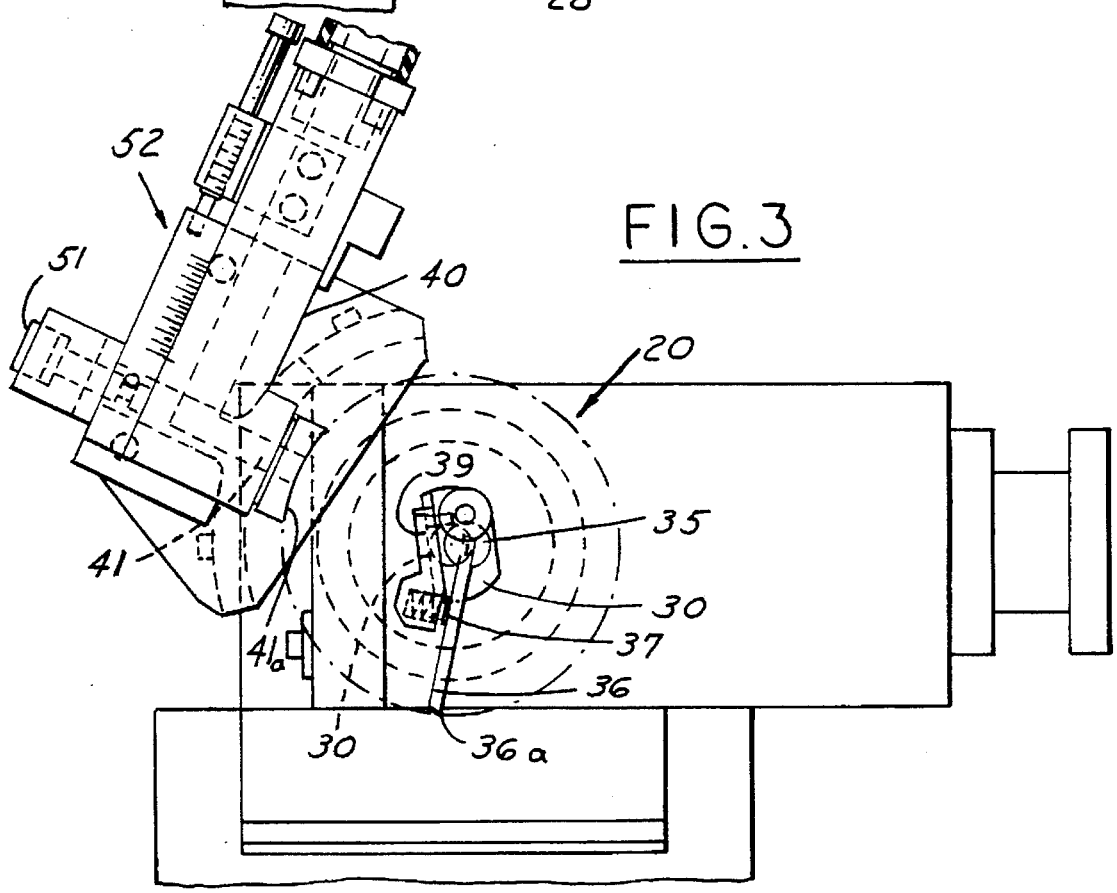
FIG. 3 is a part sectional end view thereof.
Figure 4:
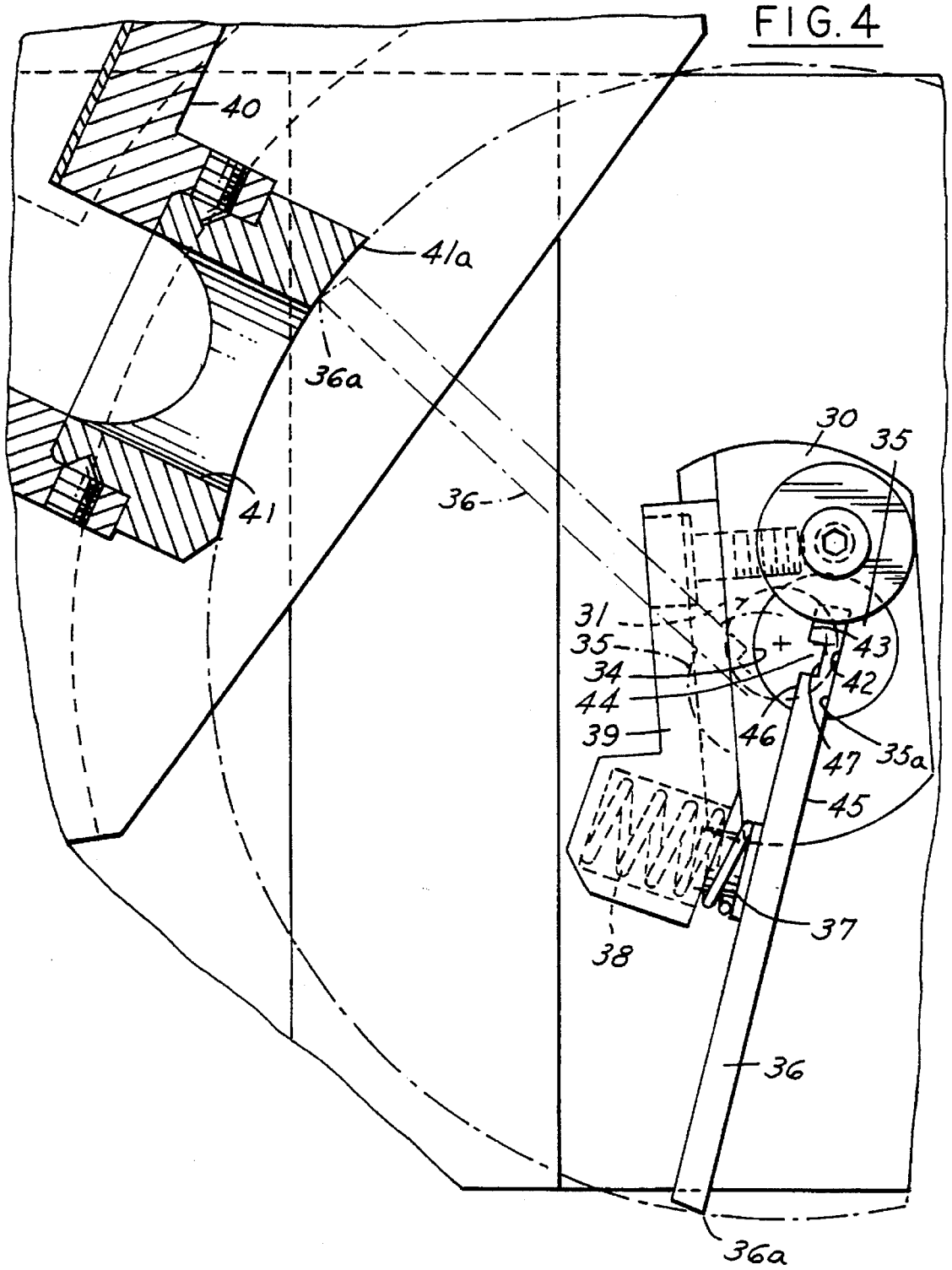
FIG. 4 is a fragmentary part sectional partly diagrammatic end view of a portion of the apparatus.

Referring to FIGS. 2–4, the cutter delivery assembly 20 includes a servo motor 26 that drives a shaft 27 supported by bearings 28, 29 to rotatably mount a removable blade holder 30. The blade holder 30 is mounted on shaft 27 by an integral shaft 31 that has an end formed with a radial key that engages a complementary key in the shaft 27. The shaft 31 is locked to shaft 27 by a collet 32 on shaft 27 that has a collet nut 33 threaded thereon.

The blade holder 30 has a hole 34 bored eccentrically to receive a pivot post 35 which, in turn has a slot 35a for receiving a rigid cutter blade or knife 36. The blade 36 has limited circumferential movement, being yieldingly urged in the direction of rotation by spaced plungers 37 that are urged toward the blade by springs 38 mounted in a bracket 39 such that the blade 36 is held against a stop surface on the pivot blade holder 30. The cutter blade 36 is adapted to move past a nozzle block 40 through which extrudate such as plastic material is directed out of a nozzle 41. The slot 35a on the pivot post 35 extends axially and has a flat side 42 and an opposed side 43 with an integral axial rib 44. The cutter blade 36 has an inner end with a complementary cross section that is slightly smaller to limit circumferential movement of the cutter blade 36. This cross section includes a flat side 45 and an opposed side 46 having an axial groove 47.

As the blade holder 30 rotates the free edge 36a of the cutter blade 36 is projected substantially radially onto the arcuate concave surface 41a of the nozzle 41 and is deflected angularly with respect to the blade holder 30 in a direction counter to the direction of rotation thereby providing a substantially constant force of the blade 36 against the nozzle surface 41a. As the blade 36 moves across the nozzle orifice 41, a pellet of extrudate is severed from the nozzle 41 and then upon further rotation of the blade holder 30 the free edge 36a of the blade 36 moves past the surface 41a and the yieldingly force of the plungers 37 deflect the pellet toward the work station, in this case a mold or the interior of a closure (not shown).

Figure 5:
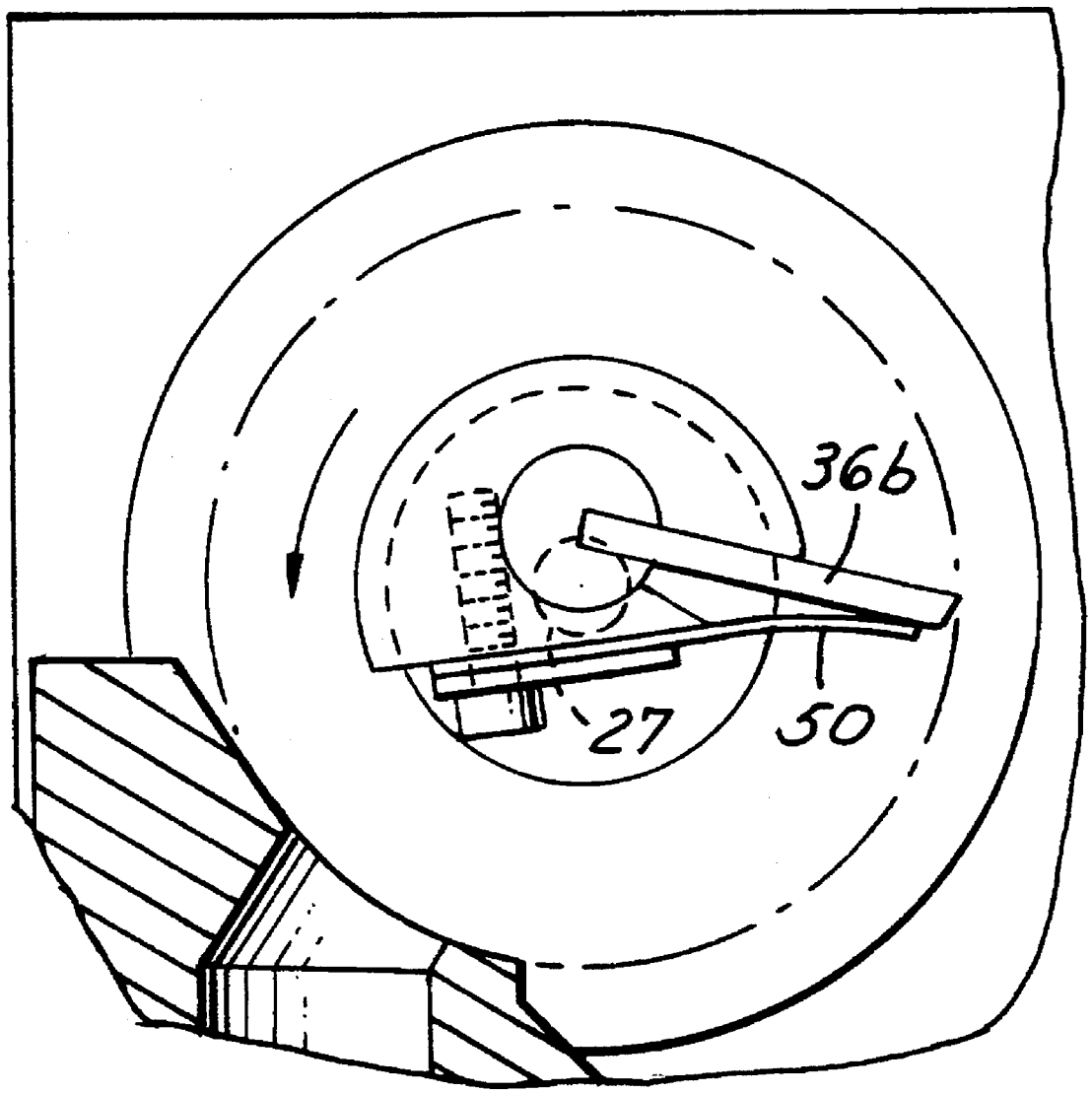
FIG. 5 is a fragmentary part sectional end view of a modified form of apparatus.

In the form shown in FIG. 5, the yielding force on the blade 36b is provided by a flat spring 50 engaging the surface of the blade.

The axis of rotation of the shaft 27 and the blade holder 30 are adjustably displaced from the arc center of the cylindrical surface 41a of the nozzle block 41.

The blade 36 and pivot post 35 could, alternatively, be manufactured as one piece, and in the shape of a key hole in cross section. The circular section of the post would function as the blade shaft forming the pivoting point of the blade.

The pivot post 35 is eccentrically mounted on the blade holder 30 in the order of 0.150 in., being housed in a bore within, and eccentric to the axis of rotation of the blade holder 30.

The two plungers 37 actuated by compression springs function on the blade 36 to preload the rotation of the blade 36 in the same direction as the rotation of the blade 36 for cutting and holding the blade 36 against a mechanical stop on the blade holder 30. Thus the blade 36 can be pivoted about the center of the pivot post 35 in a direction opposite the rotation for cutting, only by compressing the springs 38.

The drive shaft 27 is bearing mounted and driven by the servo motor 26 at a rotational speed proportional to the rate of delivery of the mold or closure to which the pellet is delivered.

Relative sliding movement of the cutter assembly 20 to the nozzle assembly 52 is provided in order to clear the cutter 36 from the extrudate while extruding material during set up and while not rotating the cutter. Also relative movement of the whole cutter assembly and nozzle assembly to the machine frame is provided such that extrudate can exit the nozzle 41 and fall to a collecting area away from the cap delivery means.

Operation

The cutter drive shaft 27 is driven at a rotational speed proportional to the rate of delivery of the molds or caps. The extrudate is allowed to stabilize at a controlled delivery rate proportional to the rate of delivery of the molds or caps. The nozzle is then moved to engage the blade 36 with the nozzle 41, and its position is fixed by the adjustment screw 51 such that the normal path of the blade tip would cause an interference with the nozzle of about 0.015 in., for example.

The nozzle 41 has a generally cylindrical surface, and has a tangential surface portion 41a at the entry position of the cutter blade 36 to allow for the entry of the blade 36. As the blade 36 contacts the entry area of the nozzle 41, the tip 36a of the blade 36 is held back by friction, and as the drive shaft 27 continues to rotate, the blade 36 pivots within its eccentric bushing in a direction relatively opposite that of the cutter shaft rotation and in opposition to the springs 38. This action causes the blade tip 36a to move in toward the center of the drive shaft 27, and this in turn results in an effective reduction in the arc radius subscribed by the blade tip 36a, until the subscribed arc matches the generally cylindrical surface 41a of the nozzle 40. If the generally cylindrical surface 41a of the nozzle 41 is not exactly concentric to the axis of the cutter drive shaft 27, then the tip 36a of the blade 36 accommodates this variation by pivoting of the blade 36 in either the direction of rotation under spring pressure or in the reverse direction by the action of friction with the nozzle.

When the cutting is complete, and the cutter blade 36 leaves the nozzle 41, the plungers 34 extend, and cause a "flip" action to the blade 36 which helps to release the pellet from the blade 36.

When the cutting action is stabilized, the whole cutter and nozzle assembly is moved in toward the cap delivery system, and the pellets are directed into the moving cap in preparation for molding.

It can thus be seen the pellet delivery system provides a pellet cutting knife 36 that engages and transverses a nozzle from which a continuous stream of extrudate is being supplied from an extruder and/or pump and thereby cleanly cut the extrudate into individual pellets without stringing the material. In order to avoid fatigue breakage or weakening of the blade, it is desirable to use a blade of solid construction, and this necessitates a means to ensure that the blade can slide over the nozzle surface and yet maintain a minimum, controlled interference with the nozzle. To achieve this, the blade is mounted on an axis which is eccentric to the axis of the drive shaft, such that any pivoting of the solid blade about its own axis will displace the tip of the blade, relative to the centerline of the drive axis, in a radial direction. To establish a primary position of the blade relative to the drive axis, and further to provide resilience against (pivoting) deflection of the blade about its mounting axis, a spring means is used to act as a torsional bias to the blade.

By choice of geometry, the apparatus automatically compensates for cutter wear, and for variability in the setting of the drive axis relative to the nozzle (cutter engagement). Deflection of the cutter as it engages the nozzle and the simultaneous radially inward movement of the blade tip ensures a substantially consistent force of the blade against the nozzle, for varying amount of adjustment of the drive shaft displacement from the nozzle and/or blade tip wear.

Compared to a flexible steel blade, the present apparatus has the following advantages:

1) Rigid blade is less susceptible to breakage, and will not fatigue.

2) Device is less dependent upon operator skill in setting the device, and needs less attention.

3) Rigid blade can be manufactured from any of several material choices to suit application.

4) Consistent blade engagement independent of cutter engagement setting.

5) More substantial mounting than flexible blade, having better alignment to nozzle.

6) Better control of pellet placement due to less variability in blade engagement.

7) Means to continually compensate for variance in the radius of the arc swept by the tip of a rigid blade as the tip contacts a substantially cylindrical surface. This variance being a result of axis displacement of the cutter drive shaft from the said cylindrical surface, or eccentricity of the cylindrical surface to the axis of rotation or undulations in the cylindrical surface.

I claim:

1. A pellet delivery system comprising an extruder nozzle comprising a body having an orifice through which an extrudate is delivered and an arcuate concave substantially cylindrical surface intersected by said orifice, a rigid cutting knife having a free edge, a rotating shaft rotatable about an axis parallel to the axis of the cylindrical surface, means for mounting said rigid cutting knife on said shaft such that a free edge of said cutting blade is moved past said orifice surface and engages said surface, said means for mounting said rigid cutting knife being such that said knife has limited angular movement circumferentially along its free edge which engages said surface, said means for mounting said cutting knife including means yieldingly urging said cutting knife in a direction corresponding to the direction of rotation of said shaft such that when said shaft is rotated, said surface is engaged by the free edge of the cutting knife, the cutting knife is deflected angularly with respect to said shaft in the direction opposite to the direction of rotation and the free edge moves radially inwardly to conform to the arcuate cylindrical surface and sever a pellet from the extrudate, said means for mounting said cutting knife comprising a blade holder mounted on said shaft and having a slot for receiving said rigid cutting knife, means for providing limited angular movement of said knife circumferentially.

2. The pellet delivery system set forth in claim 1 wherein said means yieldingly urging said cutting knife circumferentially comprising spaced plungers and springs associated by said plungers and urging said plungers into contact with said knife.

3. The pellet delivery system set forth in claim 1 wherein said means yieldingly urging said cutting knife circumferentially comprises a flat opening engaging a surface of said knife.

4. The pellet delivery system set forth in claim 1 including an integral shaft supporting said blade holder and means locking integral shaft to said rotating shaft.

5. The pellet delivery system set forth in claim 4 wherein said means locking said integral shaft comprises a collet on the rotating shaft and a collet next threaded on said rotating shaft.

6. The pellet delivery system set forth in claim 1 wherein said blade holder includes a pivot post having said slot therein.

7. The pellet delivery system set forth in claim 6 wherein said pivot post has an axial rib along one surface of said slot, said knife having an axial groove engaging said rib.

8. The pellet delivery system set forth in any one of claims 1–7 including a servo motor driving said rotating shaft.

9. The pellet delivery system set forth in claim 8 wherein said rotating shaft, cutting knife means for mounting said knife on said shaft and said servo motor comprises a cutter assembly and means for moving said cutter assembly toward and away from said extruder nozzle.

* * * * *